United States Patent Office 3,502,735
Patented Mar. 24, 1970

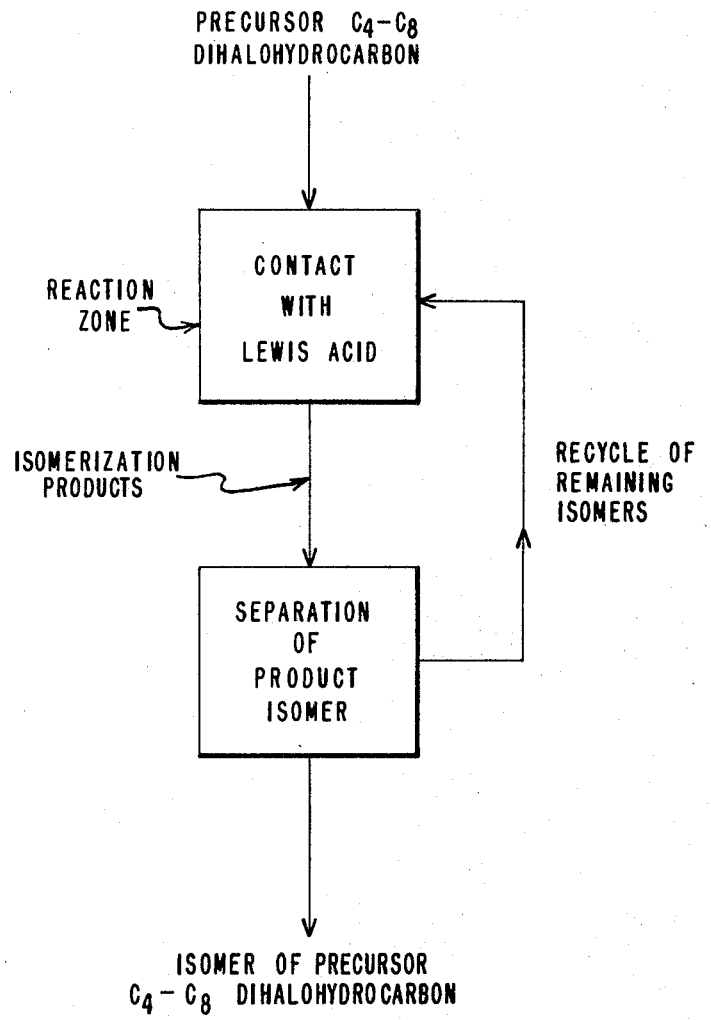

3,502,735
PROCESS FOR ISOMERIZING
DIHALOHYDROCARBONS
Harry B. Copelin, 9007 Jayne Place,
Niagara Falls, N.Y. 14303
Continuation-in-part of application Ser. No. 320,627,
Nov. 1, 1963. This application Aug. 19, 1966, Ser.
No. 573,676
Int. Cl. C07c 17/00
U.S. Cl. 260—658                3 Claims This application is a continuation-in-part of Ser. No. 320,627, filed Nov. 1, 1963, now abandoned.

This invention relates to the preparation of dihalohydrocarbons, and more particularly, to the preparation of dihalohydrocarbons by an isomerization process.

Dihalohydrocarbons are valuable compounds. Of particular importance are dihaloalkanes having one halogen atom attached to the psi-carbon atom (i.e., the next-to-last carbon atom in the carbon chain) and one halogen attached to another carbon atom, especially the alpha-carbon atom (i.e., the first carbon atom in the carbon chain). These dihaloalkanes may be dehydrohalogenated to obtain diolefins or haloolefins. In addition, since the primary or primary and secondary halogen can be replaced by other functional groups, such as cyano, hydroxyl, amino, carboxy, thiol, methyl amino, acyloxy, and others, a broad spectrum of products can be prepared from alpha, psi-dihaloalkanes. Many of these products are of considerable commercial value in the preparation of intermediates for condensation or addition polymers, such as polyesters, polyamides, polyurethanes, and polyolefins.

A few dihalohydrocarbons are readily available. However, many dihalohydrocarbons heretofore have been available only by complicated, commercially unpractical processes. It is desired to provide a process for the facile preparation of such dihalohydrocarbons. Furthermore, it is desired to obtain a process whereby readily available dihalohydrocarbons may be isomerized to produce other valuable dihalohydrocarbon isomers. Moreover, since alpha, beta-dihaloalkanes are readily available from low-cost alpha-olefins, and since alpha, psi-dihaloalkanes are particularly important compounds, it is especially desired to provide a convenient process for isomerizing alpha, beta-dihaloalkanes to obtain alpha, psi-dihaloalkanes.

An object of this invention is to provide an improved process for the preparation of dihalohydrocarbons. Another object is to provide an improved process for the isomerization of dihalohydrocarbons. A further object is to provide an improved process for the isomerization of dihaloalkanes. An additional object is to provide an improved process for the preparation of alpha, psi-dihaloalkanes. Another object is to provide an improved process for the preparation of alpha, psi-dihaloalkanes by the isomerization of straight-chain dihaloalkanes having 4 to 8 carbon atoms and having two halogen atoms each attached to two different carbon atoms other than the psi-carbon atom. Still another object is to provide an improved process for the preparation of alpha, psi-dihaloalkanes by the isomerization of straight-chain alpha, beta-dihaloalkanes of 4 to 8 carbon atoms.

These and other objects are attained by the herein described invention which provides the continuous, cyclic process for isomerizing a saturated dihalohydrocarbon of 4 to 8 carbon atoms having one halogen atom selected from the group consisting of chlorine, bromine, and iodine on each of two carbon atoms, said process comprising contacting the said dihalohydrocarbon with a Lewis acid in a reaction zone at a temperature between the freezing point of the combined constituents present in the said reaction zone and 250° C., and thereafter removing the resulting isomerization products from the said reaction zone, separating at least a substantial proportion of an isomer of said dihalohydrocarbon from the said isomerization products and returning the remaining isomerization products to the said reaction zone. In a preferred embodiment of this invention an alpha, beta-dihaloalkane is isomerized by this process to yield an alpha, psi-dihaloalkane.

The drawing is a simplified flow diagram showing the general process of this invention.

As used herein to identify the position of the carbon atoms in an alkane carbon chain, the "alpha-carbon atom" refers to the first carbon atom in the carbon chain, the "beta-carbon atom" refers to second carbon atom in the carbon chain, and so forth. The "psi-carbon atom" refers to the next-to-last carbon atom in the carbon chain.

Any saturated dihalohydrocarbon of 4 to 8 carbon atoms having one halogen atom selected from the group consisting of chlorine, bromine, and iodine on each of two carbon atoms, may be isomerized by the process of this invention. As used herein, the term "saturated" means that the dihalohydrocarbon possesses no ethylenic unsaturation. The dihalohydrocarbon must contain two halogen atoms attached to different carbon atoms. These halogen atoms may be identical (i.e., the dihalohydrocarbon may contain two chlorine atoms, two bromine atoms, or two iodine atoms), or they may be different (i.e., one chlorine atom and one bromine atom, etc.). The dihalohydrocarbon may be a cyclic compound such as the dihalocyclohexanes, and the like; a branched-chain dihaloalkane, such as the dihalomethylbutanes and dihalomethylpentanes, and the like; or a straight-chain alkane such as the dihalo derivatives of butane, pentane, hexane, heptane, and octane including 1,2-dichlorobutane, 1,4-dibromobutane, 2,3-dichloropentane, 1,2-diiodohexane, 1,3-dichlorohexane, 2,3-dichloroheptane, 3,6-dichlorooctane, and the like. As stated hereinbefore, the alpha, psi-dihaloalkanes are particularly preferred products. These alpha, psi-dihaloalkanes may be derived from any of the other straight-chain dihaloalkane isomers, particularly those straight-chain dihaloalkanes having one halogen atom attached to the alpha-carbon atom and one halogen atom attached to another carbon atom other than the psi-carbon atom (i.e., the psi-carbon atom being in a methylene group, —$CH_2$—). Because of their ready availability from low-cost alpha-olefins, the alpha, beta-dihaloalkanes, such as 1,2-dichlorobutane, 1,2-dibromopentane, etc., are especially preferred starting materials for isomerization in the process of this invention. For convenience of expression in the further ensuing discussion of this invention, the dihalohydrocarbons used as starting isomers are referred to as the "precursor dihalohydrocarbons."

The process of this invention is of particular usefulness when the precursor dihalohydrocarbon is a dihalohydrocarbon (and especially a dihaloalkane) containing 5 to 8 carbon atoms. With these starting materials, a larger number of isomer possibilities exist, and hence the concentration of any given isomer after the initial isomerization step tends to be lower. It is thus of greater relative importance to be able to remove the desired isomer from the initial isomerization mixture and then recycle the other isomers to form additional amounts of the particular desired isomer. The overall conversions and yields are thus very greatly improved as compared to those obtainable by operating merely a single-step isomerization process. Expressed in another way, if one is operating a single stage isomerization process, the amount of undesired by-product obtained tends to increase as the number of carbon atoms in the dihaloalkane starting material increases; and it thus becomes increasingly important to be able to recycle all of those undesired by-products and eventually convert them over virtually completely, via the multi-stage isomerization process, to the particular desired isomer.

When working with the dihaloalkanes, the isomer which is formed in the greatest quantities during the isomerization step is generally the alpha-psi isomer. Nevertheless, the other possible isomers are also present, although generally in lesser amounts. With the dichlorobutanes, the proportion of the 1,3 isomer is very high in the equilibrium mixture, i.e., about 90%. In addition, about 3% of the 1,4 isomer and about 7% of the 1,2 isomer are present. Depending upon which isomer one starts with, and depending upon how far one goes towards establishing equilibrium, the actual mixture obtained can frequently be quite different from what the ultimate equilibrium mixture would be.

One aspect of this invention which may be particularly advantageous involves using, as the precursor dihalohydrocarbon, an alpha-omega dihaloalkane, such as 1,4-dichlorobutane. The prior art (see British Patent 535,435) indicates that the isomerization of dichloroalkanes causes the chlorine atoms to "be spaced further apart"; and it gives no indication that any equilibrium reaction is involved. It is thus surprising to find that, in the case of the alpha-omega isomers, the chlorine atoms actually move closer together when subjected to this isomerization. The alpha-psi isomer tends to be formed in the relatively larger amounts, and even some of the alpha-beta isomer is formed. By using the recycle process of the present invention, a dihaloalkane in which the halogen atoms are spaced relatively far apart can eventually be converted virtually completely into any one of the corresponding isomers in which the halogen atoms are spaced more closely together.

The isomerization products which are recycled include not only any unseparated amount of the desired isomer but also the other remaining isomerization products and any unconverted precursor dihalohydrocarbon. The conditions in the reaction zone remain essentially the same. Once the continuous process has been established, the feed to the reaction zone comprises a combination of the recycled isomerization products plus fresh precursor dihalohydrocarbon.

The Lewis acids, which function as catalysts in the process of this invention, are well known in the art, being defined and described, for example, in Vanderwerf, Acids and Bases and the Chemistry of the Covalent Bond, Reinhold Publishing Corp. (New York), pp. 60–71. Simply stated, Lewis acids are elements and compounds which function as electron pair acceptors. Lewis acids have at least one unfilled orbital in the valence shell of one of their atoms, and include, simple cations, such as aluminum (valence of $+3$), iron (valence of $+3$), lithium (valence of $+1$), boron (valence of $+3$), beryllium (valence of $+2$), and the like; compounds wherein the central atom has an incomplete octet, such as boron fluoride, aluminum chloride, aluminum bromide, titanium trichloride, and the like; compounds wherein the octet of the central atom can be expanded, such as silicon tetrafluoride, stannic chloride, titanium tetrachloride, phosphorus trichloride, sulfur tetrafluoride, selenium tetrafluoride, and the like; compounds having multiple bonded acid centers, such as carbon dioxide and sulfur trioxide and the like; and elements with an electron sextet, such as atomic oxygen and sulfur. Metallic halides and oxides, in particular aluminum chloride, aluminum bromide, ferric chloride, ferric oxide, molybdic chloride, and molybdic oxide are the preferred Lewis acids for use in the process of this invention, since this class of Lewis acids provides the greatest degree of catalytic activity.

The present invention lies in the surprising discovery that when a dihalohydrocarbon is contacted with a Lewis acid an equilibrium isomerization reaction is effected which produces a spectrum of dihalohydrocarbon isomers. Since this isomerization reaction is an equilibrium reaction, the desired dihalohydrocarbon isomer is separated from the isomerization products and the remaining isomers are recontacted with a Lewis acid to again produce the same spectrum of dihalohydrocarbon isomers from which the desired dihalohydrocarbon isomer is separated, and on ad infinitum. Therefore, by applying this discovery to a continuous, cyclic process whereby the precursor dihalohydrocarbon is contacted with a Lewis acid in a reaction zone, then the resulting isomerization products are removed from the reaction zone, then the desired dihalohydrocarbon is separated from the isomerization products and the remaining isomers are returned to the reaction zone, there is obtained a unique method for the isomerization of a precursor dihalohydrocarbon which can provide virtually 100% conversion and 100% yield to the desired dihalohydrocarbon. This process is illustrated schematically by the drawing.

In the practice of this invention, the precursor dihalohydrocarbon is introduced into contact with the Lewis acid in a reaction zone, i.e., any suitable reactor vessel which is adapted for use in a continuous, cyclic process, such as a pipe line reactor or continuous flow vessel and the like. The isomerization reaction can be effectively conducted by contacting the precursor dihalohydrocarbon and Lewis acid alone in the reaction zone, although other components may be present. In fact, in some instances it is beneficial to introduce other components into the reaction zone. For example, the precursor dihalohydrocarbon may be dissolved in an inert liquid solvent such as carbon tetrachloride, hexachlorobutadiene, hexachloroethane, and perchloroethylene. Also, where the precursor dihalohydrocarbon is a dichlorohydrocarbon, it is beneficial to introduce HCl gas into the reaction zone to repress the tendency for the elimination of HCl from the dihalohydrocarbon. Similarly, where the precursor dihalohydrocarbon is a dibromohydrocarbon, it is beneficial to introduce HBr gas into the reaction zone.

The reaction may be conducted either in the vapor phase or the liquid phase. Normally, it is most convenient to operate a liquid phase process.

Lewis acids are available in the physical forms of solids, liquids, and gases, all of which are operable in the practice of this invention. Lewis acids that are gasses at room temperature and pressure, may be used as gases in vapor phase operations, or may be used in low temperature, pressurized liquid phase operations wherein the Lewis acid is transformed into a liquid. Solid Lewis acids may be used in either vapor phase or liquid phase operations, preferably in the form of relatively finely divided particles to insure adequate surface area exposure. Liquid and soluble solid Lewis acids are best suited for use in liquid phase operations. The common inert catalyst supports, such as silica, alumina, quartz, carbon, silicon carbide, and the like can be used with these Lewis acids. However, catalysts supports ordinarily are not needed, and since some of them tend to disintegrate or dissolve during the process, they often are undesirable.

The use of different Lewis acids does not affect the isomerization product distribution equilibrium. However, as stated hereinbefore, the metallic halides and oxides, in particular aluminum chloride, aluminum bromide, ferric chloride, ferric oxide, molybdic chloride, and molybdic oxide are the preferred Lewis acids for use in this invention since this class of Lewis acids provides the greatest degree of catalytic activity. As the process proceeds, there usually is a gradual loss in catalyst effectiveness resulting from both a decrease in catalytic activity and a physical loss of the Lewis acid by product entrainment, decomposition, process leakage, etc. Therefore, it is generally necessary to periodically, or continually, replenish the reaction zone with additional Lewis acid. Generally, the Lewis acid requirements are larger for the relatively long chain and branched-chain precursor dihaloalkanes than for the short chain precursor dihaloalkanes. Also, the dibromides produce lower Lewis acid consumption than do dichlorides.

Since this invention embodies a continuous, cyclic process, virtually any contact time between the Lewis acid and the precursor dihaloalkane may be used. Relatively short contact time results in a relatively small yield of the desired isomer product per pass, but merely requires that a large proportion of isomers be recycled to the reaction zone. Excessively long contact time, of course, does not increase the yield of the desired isomer product, after the equilibrium isomer distribution is reached.

The temperature of the reaction zone should be maintained between the freezing point of the combined constituents present in the reaction zone and 250° C. The lower temperature limitation depends on the particular reactants and inert materials present in the reaction zone, and also, whether or not the reaction zone is operated under pressure. Where the precursor and recycle dihalohydrocarbons are the sole materials introduced into the reaction zone and where the Lewis acid is an insoluble solid and where the reaction zone is maintained at atmospheric pressure, this lower temperature limitation is the freezing point of the mixture of dihalohydrocarbons present in the reaction zone. It will be recognized that the presence of these factors, such as the use of solvents, HCl or HBr gas or the like, use of pressure and so forth will affect the freezing point of the constituents present in the reaction zone. The process, of course, will not function at the freezing point of the combined constituents present in the reaction zone or at lower temperatures. Above 250° C. the reaction becomes violent and practically uncontrollable unless a relatively inactive Lewis acid is used. Also at such elevated temperature there is excessive HCl evolution where a dichlorohydrocarbon is being isomerized, or HBr evolution in the case of a dibromohydrocarbon, producing excessive quantities of olefins and tars. However, it should be noted that the process of this invention may be successfully operated at elevated temperatures around 250° C. by conducting the isomerization under elevated pressure and preferably in the presence of HCl gas or HBr gas (depending on whether the precursor dihalohydrocarbon is a dichloro- or a dibromo-derivative, respectively). Preferably the temperature is maintained between −50° and +50° C., especially when the preferred metallic halides and oxides are employed.

After contacting the precursor dihalohydrocarbon with the Lewis acid in the reaction zone, the isomerization products are removed from the reaction zone and at least a substantial proportion (on the order of about 75% by weight) of the desired dihalohydrocarbon isomer is separated therefrom. If convenient or desired, a portion of the desired dihalohydrocarbon may be recycled with the other isomers. However, an optimum through-put rate will not be attained unless at least a substantial proportion of the desired dihalohydrocarbon is removed from the resulting isomerization products. Since these isomers have different boiling points, this separation may be accomplished by fractionation or vapor phase preparative chromatography. Also, the isomers may be separated by use of a molecular sieve or by familiar freezing techniques. Other suitable methods for separating these isomers will be obvious to those skilled in chemical engineering unit operations. Obviously, in many instances it is not practical or even possible to remove only the isomerization products from the reaction zone. Solvent, HCl or HBr gas, and Lewis acid, particularly if the Lewis acid is a liquid or a gas, usually are removed from the reaction zone along with the isomerization products. These other materials may be separated from the isomerization products and either discarded or returned to the reaction zone either with or without prior treatment, such as purification, if so desired. Normally, it is preferred to either deactivate or remove any Lewis acid contained in the isomerization products prior to recycle. Generally, it is most convenient to not separate the other materials from the isomerization products, but instead, remove the desired dihalohydrocarbon isomer product, and then return the unwanted isomers, together with these materials, to the reaction zone.

After the desired dihalohydrocarbon isomer is separated from the isomerization products, the remaining isomers are returned to the reaction zone. This recycling step may be accomplished either by returning the isomers to the reaction zone via the precursor dihalohydrocarbon inlet stream or by returning the isomers directly to the reaction zone via a separate inlet site.

As discussed hereinbefore, dihalohydrocarbons, and in particular the alpha, psi-dihaloalkanes, are commercially valuable in the preparation of intermedaites for condensation and addition polymers, such as polyesters, polyamides, polyurethanes, and polyolefins. The process of this invention is particularly suitable for use as an intermediate step in a process for producing adiponitrile from butene-1. In such process butene-1 is chlorinated by reacting with chlorine in the presence of a trace of oxygen to obtain 1,2-dichlorobutane. The 1,2-dichlorobutane is isomerized to 1,3-dichlorobutane by the process of the present invention. The 1,3-dichlorobutane is the dehydrohalogenated by contacting with a dehydrohalogenation catalyst, such as alumina rhodium on alumina, palladium on alumina, and barium chloride or calcium chloride on activated carbon, at a temperature of between the boiling point of the 1,3-dichlorobutane and 400° C., to thereby obtain 4-chlorobutene-1. The 4-chlorobutene-1 is then reacted with hydrogen bromide in a free-radical reaction to effect a reverse addition thereof to thereby obtain 1-bromo-4-chlorobutane. The 1-bromo-4-chlorobutane is then reacted with sodium cyanide to obtain adiponitrile.

This invention is further illustrated by the following examples which provide equilibrium and catalyst activity data. In these examples, all percentages are in terms of percent by weight.

EXAMPLE 1

This example illustrates equilibrium data for the isomerization of 1,2-dichloropentane. The laboratory equipment used in this example, and Examples 2 through 8 (except where noted) consisted of a round-bottom glass flask partially immersed in a cooling bath and fitted with a mechanical stirrer and thermometer. The 1,2-dichloropentane starting material contained 99.1% 1,2-dichloropentane, 0.7% of other dichloropentane isomers and 0.2% of low boiling impurities. To 864 grams of this 1,2-dichloropentane starting material at a temperature of 0° C., was added 13.3 grams of anhydrous aluminum chloride, with stirring. The temperature rose to 5° C. After the 5° exotherm subsided, an additional 13.6 grams of anhydrous aluminum chloride were added while continuing stirring. There was a rapid exotherm to 26° C. accompanied by the evolution of some hydrogen chloride. Stirring was continued for a total reaction of one hour. Then about 260 ml. of cool (room temperature) water was added, and the mixture was steam distilled to separate 810 grams of liquid product and 28 grams of oily polymer. The composition of this liquid product as determined by gas-liquid chromatography is shown below:

| Product: | Weight percent |
|---|---|
| Low boilers | 4.88 |
| 1,2-dichloropentane | 7.72 |
| 1,3-dichloropentane | 20.65 |
| 1,4-dichloropentane | 66.75 |

The ratio of the 1,3 isomer to the 1,4 isomer (a measure of equilibrium) was 0.31. Yields and conversions can be improved by prevention of any exotherm by gradual catalyst addition.

EXAMPLE 2

This example illustrates the effect of recycling a portion of the isomerization products to the reaction zone. A part of the 1,4-dichloropentane and low boilers were separated from the liquid product obtained in Example 1, to obtain a mixture of 10.9% of 1,2-dichloropentane, 46.1% 1,3-dichloropentane and 42.4% 1,4-dichloropentane (ratio of the 1,3 isomer to the 1,4 isomer being 1.09). To 70 grams of this mixture was added 0.7 gram of anhydrous aluminum chloride at 0° C. with stirring. The stirring was continued for a total reaction time of 45 minutes. The liquid product was separated and analyzed as shown in Example 1. The composition of the resultant liquid product is shown below:

| Product: | Weight percent |
|---|---|
| Low boilers | 2.5 |
| 1,2-dichloropentane | 10.2 |
| 1,3-dichloropentane | 20.9 |
| 1,4-dichloropentane | 67.4 |

The equilibrium 1,3 isomer/1,4 isomer ratio of 0.31 was restored. These results show that in a continuous process for the isomerization of a dihalohydrocarbon, as herein described, the desired dihalohydrocarbon isomer may be removed from the isomerization products and the remaining isomers returned to the reaction zone to thereby provide a continuous cyclic process which can approach the theoretic 100% conversion and yield of 100% of the desired dihalohydrocarbon isomer.

EXAMPLE 3

This example illustrates the isomerization of 1,2-dibromopentane. The 1,2-dibromopentane used in this example was 96.3% pure, with all impurities being low boilers. To 415 grams of this 1,2-dibromopentane starting material at 0° C. was added 15.4 grams of anhydrous aluminum bromide, with stirring. The stirring was continued for a total reaction time of 1.35 hours. The liquid product which was separated and analyzed as shown in Example 1 had the following composition:

| Product: | Weight percent |
|---|---|
| Low boilers | 5.30 |
| 1,2-dibromopentane | 5.00 |
| 1,3-dibromopentane | 23.53 |
| 1,4-dibromopentane | 66.50 |

The ratio of the 1,3 isomer to the 1,4 isomer was 0.35.

EXAMPLE 4

This example demonstrates the isomerization of 1,2-dichlorohexane. To 250 grams of 1,2-dichlorohexane (99.5% pure-contained 0.5% low boilers) at 0° C., was added 2.5 grams of anhydrous aluminum chloride with stirring. The stirring was continued for 1.5 hours, at which time the liquid product was separated and analyzed as shown in Example 1. The liquid product contained:

| Product: | Weight percent |
|---|---|
| Low boilers | 0.51 |
| 1,2-dichlorohexane | 65.65 |
| 1,3-dichlorohexane | 3.84 |
| 1,4-dichlorohexane | 11.91 |
| 1,5-dichlorohexane | 18.10 |

The ratio of the 1,3 isomer to the 1,5 isomer was 0.21 and the ratio of the 1,4 isomer to the 1,5 isomer was 0.66.

EXAMPLE 5

This example illustrates the isomerization of 1,2-dichlorohexane in the presence of a solvent. To 50 grams of the 1,2-dichlorohexane used in Example 4 and 50 grams of carbon tetrachloride at 0° C., was added 0.5 gram of anhydrous aluminum chloride with stirring. The stirring was continued for a total reaction time of 1 hour. The liquid product was separated and analyzed as shown in Example 1, and contained:

| Product: | Weight percent |
|---|---|
| Low boilers | 0.64 |
| 1-,2-dichlorohexane | 86.15 |
| 1,3-dichlorohexane | 1.66 |
| 1,4-dichlorohexane | 4.65 |
| 1,5-dichlorohexane | 6.84 |

The ratio of the 1,3 isomer to the 1,5 isomer was 0.24 and the ratio of the 1,4 isomer to the 1,5 isomer was 0.68.

EXAMPLE 6

In this example 1,2-dichlorohexane was isomerized at different temperatures. In each test of this example, 10 grams of 1,2-dichlorohexane (as used in Example 4) was charged to a test tube partially immersed in a cooling bath maintained at the temperature noted below. To this 1,2-dichlorohexane was added anhydrous aluminum chloride (0.82 gram for Tests 1 and 2, and 0.3 gram for Test 3). This mixture was not stirred. Total reaction times are also noted below. The isomerization products and equilibrium ratios were as follows (dichlorohexane is herein abbreviated "DCH"):

| | Test Number | | |
|---|---|---|---|
| | 1 | 2 | 3 |
| Temperature, ° C | −25 | 0 | +25 |
| Reaction Time, Min | 220 | 20 | 205 |
| Product: | | | |
| Low Boilers | 1.32 | 8.85 | 2.31 |
| 1,2-DCH | 19.05 | 16.60 | 15.50 |
| 1,3-DCH | 7.10 | 8.49 | 6.85 |
| 1,4-DCH | 27.03 | 25.63 | 27.50 |
| 1,5-DCH | 45.45 | 40.45 | 46.60 |
| Ratios of Isomers: | | | |
| 1,3/1,5 | 0.16 | 0.21 | 0.15 |
| 1,4/1,5 | 0.59 | 0.64 | 0.59 |

EXAMPLE 7

This example illustrates the equilibrium of the isomerization of 1,2-dichlorooctane. To 86 grams of 1,2-dichlorooctane, maintained at 0° C., was added 1.73 grams of anhydrous aluminum chloride and the mixture was stirred for 18.7 hours. The resultant liquid products were steam distilled and analyzed as shown in Example 1. The product contained the following isomer distribution based on the total weight of isomers other than 1,2-dichlorooctane as 100%:

| Product: | Weight percent |
|---|---|
| 1,3-dichlorooctane | 5 |
| 1,4-dichlorooctane | 10 |
| 1,5-dichlorooctane | 15 |
| 1,6-dichlorooctane | 35 |
| 1,7-dichlorooctane | 35 |

EXAMPLE 8

This example illustrates the equilibrium of the isomerization of 1,4-dichlorobutane. To 200 grams of 1,4-dichlorobutane (containing 3.0% 1,2-dichlorobutane and 1,3-dichlorobutane) at 0° C. was added 8 grams of anhydrous aluminum chloride, with stirring. Additional anhydrous aluminum chloride was added in 1 gram increments at intervals of 1 hours, until a total of 8 grams were added with continuous stirring. After a total reaction time of 25 hours, the product had the following composition:

| Product: | Weight percent |
|---|---|
| 1,2-dichlorobutane | 4.24 |
| 1,3-dichlorobutane | 62.9 |
| 1,4-dichlorobutane | 32.4 |

EXAMPLE 9

This example illustrates the equilibrium for the isomerization of 1,2-dichloro-3-methylbutane. To 10.8 grams of 1,2-dichloro-3-methylbutane at −30° C. was added 2.2 grams of anhydrous aluminum chloride. This mixture was stirred for a total of 1.5 hours, at which time the product had the following composition:

| Product: | Weight percent |
|---|---|
| Low boilers | 0.74 |
| 1,2-dichloro-2-methylbutane | 3.98 |
| 1,2-dichloro-3-methylbutane | 77.6 |
| 1,3-dichloro-3-methylbutane | 14.17 |
| 1,3-dichloro-2-methylbutane | 3.62 |

EXAMPLE 10

This example illustrates the isomerization of 1,2-dichlorocyclohexane. To 60 grams of 1,2-dichlorocyclohexane (about 95% being the trans isomer and 5% being the cis isomer) was added 1.2 grams of anhydrous aluminum chloride with stirring. The stirring was continued for 5.67 hours, at which time the product had the following composition (dichlorocyclohexane is abbreviated "DCCH"):

| Product: | Weight percent |
|---|---|
| cis-1,2-DCCH | ---- |
| trans-1,2-DCCH | 52.15 |
| cis-1,3-DCCH | 10.97 |
| trans-1,3-DCCH | 6.38 |
| cis-1,4-DCCH | 16.73 |
| trans-1,4-DCCH | 13.95 |

EXAMPLE 11

This example illustrates the catalytic activity of various common Lewis acids in the isomerization of dihalohydrocarbons in accordance with this invention. In each test of this example, 55 grams of 1,2-dichlorobutane (99.7% pure) was charged to a stirred autoclave. To this charge was added 5 grams of the Lewis acid shown in Table I. The mixture was stirred for a total reaction time of 30 minutes under HCl pressure as shown in the table. The products were anlayzed, and the compositions thereof are recorded in Table I. It should be noted that the data shown in Table I do not represent equilibrium data, since the isomerization reaction was permitted to continue only for 30 minutes, which for many Lewis acids is insufficient time to reach equilibrium. These data are intended to demonstrate relative catalytic activity. In this table, dichlorobutane is abbreviated "DCB."

TABLE I

| Test No. | Lewis Acid | Max. Temp., °C. | Pressure (p.s.i.g.) | 1,1-DCB Percent | 2,3-DCB | 1,3-DCB | 1,3-DCB | 1,4-DCB |
|---|---|---|---|---|---|---|---|---|
| 1 | $BiCl_3$ | 186 | 400–725 | 7.38 | 55.0 | 37.2 | | 0.47 |
| 2 | CdO | 202 | 400–580 | 9.74 | 80.1 | 10.1 | | 0.15 |
| 3 | $Ce(SO_4)_2$ | 176 | 400–730 | 0.46 | 85.9 | 13.6 | | ---- |
| 4 | $Co_2O_3$ | 189 | 400–640 | 0.97 | 79.4 | 19.7 | | ---- |
| 5 | $CrO_3$ | 168 | 400–710 | 1.25 | 83.2 | 15.5 | | ---- |
| 6 | $CuCl_2$ | 193 | 400–730 | 1.26 | 83.2 | 15.6 | | ---- |
| 7 | CuO | 163 | 400–910 | 1.63 | 74.2 | 24.2 | | ---- |
| 8 | $FeCl_3$ | 131 | 400–760 | 4.27 | 20.6 | 74.8 | | 0.30 |
| 9 | $Fe_2O_3$ | 109 | 400–480 | 3.18 | 17.5 | 78.8 | | 0.52 |
| 10 | $GaCl_3$ | 96 | 400–550 | 3.6 | 13.3 | 80.0 | | 1.1 |
| 11 | HgO | 250 | 400–670 | 10.07 | 76.3 | 13.6 | | 0.05 |
| 12 | KFS | 177 | 400–710 | 0.66 | 89.1 | 10.2 | | 0.07 |
| 13 | $MgCl_2$ | 180 | 400–730 | 0.62 | 85.3 | 14.1 | | ---- |
| 14 | $MgSiF_6$ | 181 | 400–800 | 0.15 | 89 | 10 | | ---- |
| 15 | $Mn_2O_3$ | 250 | 400–730 | 15.02 | 63.7 | 20.8 | | 0.45 |
| 16 | $MnO_2$ | 154 | 400–680 | 1.41 | 75.2 | 23.3 | | 0.02 |
| 17 | $MoCl_5$ | 135 | 400–560 | 2.45 | 24.1 | 73.4 | | 0.21 |
| 18 | $MoO_3$ | 136 | 400–740 | 2.96 | 33.6 | 69.9 | | 0.51 |
| 19 | NiO | 172 | 400–650 | 0.45 | 94.5 | 5.03 | | ---- |
| 20 | $PbCl_2$ | 172 | 400–680 | 0.91 | 93.8 | 5.29 | | ---- |
| 21 | $PrCl_3$ | 164 | 400–680 | 0.36 | 92.8 | 6.86 | | ---- |
| 22 | $RhCl_3$ | 139 | 400–740 | 1.10 | 89.0 | 9.84 | | ---- |
| 23 | $RuO_2$ | 193 | 400–860 | 0.67 | 85.6 | 13.7 | | ---- |
| 24 | $SbCl_5$ | 131 | 400–820 | 0.91 | 57.2 | 41.9 | | ---- |
| 25 | $Sb_2O_3$-$MoCl_5$ | 155 | 400–700 | 9.00 | 57.9 | 32.8 | | 0.27 |
| 26 | $Sb_2O_3$-$FeCl_3$ | 174 | 400–550 | 2.21 | 53.7 | 44.2 | | 0.04 |
| 27 | $Sb_2O_3$-$Bi_2O_3$ | 155 | 400–640 | 6.94 | 67.0 | 25.8 | | 0.27 |
| 28 | $SiCl_4$ | 191 | 450–700 | 1.24 | 92.0 | 6.88 | | ---- |
| 29 | $SnCl_2$ | 211 | 400–130 | 46.9 | 37.8 | 11.4 | | 1.09 |
| 30 | $SrF_2$ | 176 | 400–680 | 6.80 | 85.7 | 7.41 | | 0.04 |
| 31 | $TeO_2$ | 189 | 400–630 | 2.01 | 78.1 | 19.9 | | 0.02 |
| 32 | $TlNO_3$ | 159 | 400–630 | 0.94 | 80.1 | 19.0 | | ---- |
| 33 | $Tl_2O_3$ | 156 | 400–740 | 0.89 | 84.5 | 14.8 | | ---- |
| 34 | $VOCl_3$ | 182 | 400–710 | 1.82 | 76.9 | 21.3 | | ---- |
| 35 | $V_2O_5$ | 195 | 400–480 | 2.76 | 71.6 | 25.8 | | ---- |
| 36 | $WCl_6$ | 77 | 400–730 | 7.38 | 50.5 | 42.0 | | 0.23 |
| 37 | $YCl_3$ | 166 | 400–610 | 0.65 | 87.4 | 11.8 | | 0.10 |
| 38 | ZnO | 180 | 400–900 | 31.47 | 40.3 | 22.5 | | 3.05 |
| 39 | $ZrCl_4$ | 175 | 400–680 | 3.83 | 76.7 | 19.5 | | 0.10 |

This invention has been described in considerable detail. Obviously, there are many variations which can be made in these details without parting from the spirit and scope of this invention. Therefore, it is to be understood that this invention is not intended to be limited except as defined by the appended claims.

I claim:

1. The continuous, cyclic process for isomerizing an alpha-beta dihaloalkane of 5 to 8 carbon atoms selected from the group consisting of dichloro, dibromo and diiodoalkanes, said process comprising contacting said alpha-beta dihaloalkane with a Lewis acid in a reaction zone at a temperature of from −50° C. to +50° C., and thereafter removing the resulting isomerization products from the said reaction zone, separating at least a substantial proportion of the corresponding alpha-psi dihaloalkane isomer from the said isomerization products and returning all of the remaining isomerization products, including not only any unseparated amount of said alpha-psi isomer but also the remaining isomerization products and unconverted alpha-beta dihaloalkane, to the said reaction zone for further isomerization under essentially the same conditions.

2. The process of claim 1 wherein the precursor dihalohydrocarbon is a straight-chain dihaloalkane.

3. The process of claim 1 wherein both halogen atoms on the precursor dihalohydrocarbon are chlorine.

References Cited

UNITED STATES PATENTS

| 2,422,252 | 6/1947 | Otto | 260—654 |
| 2,467,965 | 4/1949 | Chenicek | 260—658 |
| 3,214,480 | 10/1965 | Hoffman | 260—658 |
| 3,304,337 | 2/1967 | Jordan et al. | 260—658 X |

FOREIGN PATENTS

| 731,707 | 2/1943 | Germany. |
| 535,435 | 4/1941 | Great Britain. |

LEON ZITVER, Primary Examiner

J. A. BOSKA, Assistant Examiner